United States Patent
Kollmann et al.

(10) Patent No.: US 7,344,776 B2
(45) Date of Patent: Mar. 18, 2008

(54) METHOD FOR PRODUCING CATHODES AND ANODES FOR ELECTROCHEMICAL SYSTEMS, METALLISED MATERIAL USED THEREIN, METHOD AND DEVICE FOR PRODUCTION OF SAID METALLISED MATERIAL

(76) Inventors: Wolfgang Kollmann, Pretal 197, A-8664 Veitsch (AT); Helga Kollmann, Pretal 197, A-8664 Veitsch (AT)

( * ) Notice: Subject to any disclaimer, the term of this patent is extended or adjusted under 35 U.S.C. 154(b) by 558 days.

(21) Appl. No.: 10/312,618

(22) PCT Filed: Jun. 29, 2001

(86) PCT No.: PCT/EP01/07467

§ 371 (c)(1),
(2), (4) Date: Aug. 4, 2003

(87) PCT Pub. No.: WO02/01656

PCT Pub. Date: Jan. 3, 2002

(65) Prior Publication Data

US 2004/0013812 A1    Jan. 22, 2004

(30) Foreign Application Priority Data

Jun. 29, 2000   (DE) ............................... 100 31 633

(51) Int. Cl.
*B32B 15/00*   (2006.01)
(52) U.S. Cl. ..................... 428/379; 428/389; 428/383
(58) Field of Classification Search .............. None
See application file for complete search history.

(56) References Cited

U.S. PATENT DOCUMENTS 2,720,076 A * 10/1955 Sachara ..................... 57/240
2,907,678 A * 10/1959 Bodmer et al. ............. 442/230
2,934,458 A *  4/1960 Budd et al. ................. 65/445
2,979,424 A *  4/1961 Whitehurst et al. ........ 428/378

(Continued)

FOREIGN PATENT DOCUMENTS

DE          22 39 547          2/1973

(Continued)

*Primary Examiner*—Jill Gray
(74) *Attorney, Agent, or Firm*—Fish & Richardson P.C.

(57) ABSTRACT

The invention relates to the production of composite cathodes and anodes for lithium batteries, and the cathodes and anodes thereby produced. The active mass in the form of a thin film is incorporated into a material, or the active mass together with a matrix metal or a matrix alloy is deposited on a substrate. The invention also relates to a metallised, textile material made of insulating fibres which have been made conductive and which have been completely galvanically or electrolessly plated. The fibres lying on crossovers are not baked with other fibres, but can move freely. The surface of the material is thereby optimally used. Said material is preferably used as an anode or a cathode for batteries, especially a lithium battery, and fuel cells. During the galvanising or electroless application stage in the production of the material, the fibres in the material move relatively to each other in order to avoid baking. A device for said production process comprises first rollers (13) with an elliptical cross-section and second rollers (14) with a diagonal circumferential profile (15), which extend or move the material (10) passing thereover, and conveyed thereby, in the longitudinal and lateral direction.

17 Claims, 4 Drawing Sheets

U.S. PATENT DOCUMENTS

Figure 1:
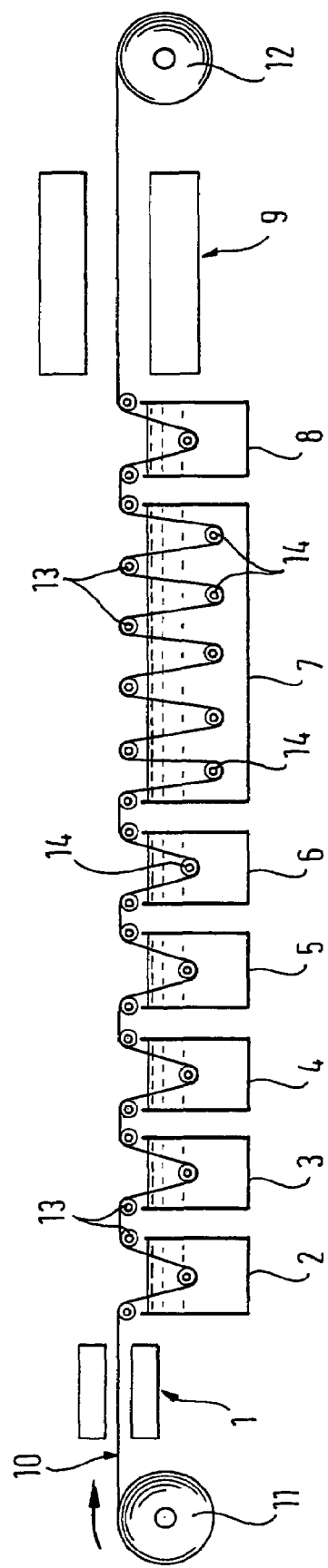

| | | | |
|---|---|---|---|
| 3,091,561 A * | 5/1963 | Marzocchi et al. | 428/292.1 |
| 3,129,487 A * | 4/1964 | Whitacre et al. | 28/166 |
| 3,843,493 A * | 10/1974 | Miller | 205/50 |
| 3,919,069 A | 11/1975 | Ascher | |
| 4,195,114 A * | 3/1980 | Crosby et al. | 428/404 |
| 4,201,825 A | 5/1980 | Ebneth | |
| 4,368,221 A * | 1/1983 | Stefan et al. | 427/305 |
| 4,514,586 A * | 4/1985 | Waggoner | 174/386 |
| 4,522,889 A * | 6/1985 | Ebneth et al. | 428/614 |
| 4,609,449 A * | 9/1986 | Morin | 204/206 |
| 4,643,918 A * | 2/1987 | Orban | 427/304 |
| 4,658,623 A * | 4/1987 | Blanyer et al. | 72/268 |
| 4,909,910 A * | 3/1990 | Morin | 205/138 |
| 4,935,296 A * | 6/1990 | Stevens | 428/381 |
| 4,942,090 A * | 7/1990 | Morin | 428/367 |
| 4,976,828 A * | 12/1990 | Morin | 205/50 |
| 5,087,515 A * | 2/1992 | Stevens et al. | 428/315.9 |
| 5,156,899 A | 10/1992 | Kistrup et al. | |
| 5,584,893 A | 12/1996 | Mitchell | |
| 5,616,152 A | 4/1997 | Velasquez et al. | |
| 5,670,278 A | 9/1997 | Disselbeck et al. | |
| 5,789,110 A | 8/1998 | Saidi et al. | |
| 6,096,101 A | 8/2000 | Liu et al. | |

FOREIGN PATENT DOCUMENTS

| | | |
|---|---|---|
| DE | 27 43 768 | 4/1979 |
| DE | 40 04 106 A1 | 8/1991 |
| DE | 195 03 447 A1 | 8/1996 |
| EP | 0 791 973 A2 | 8/1997 |
| JP | 07042079 A * | 2/1995 |

\* cited by examiner

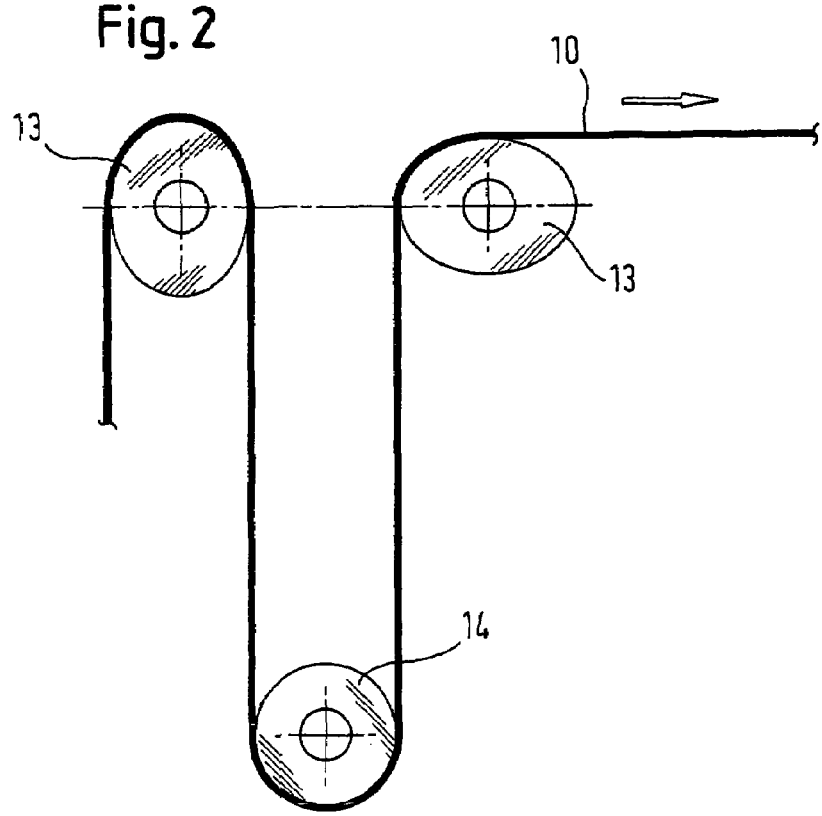
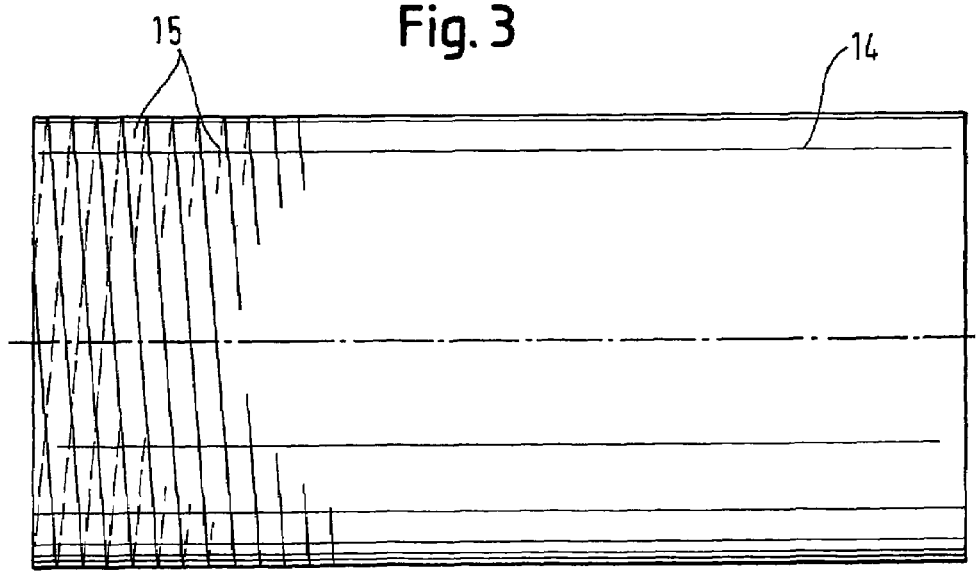

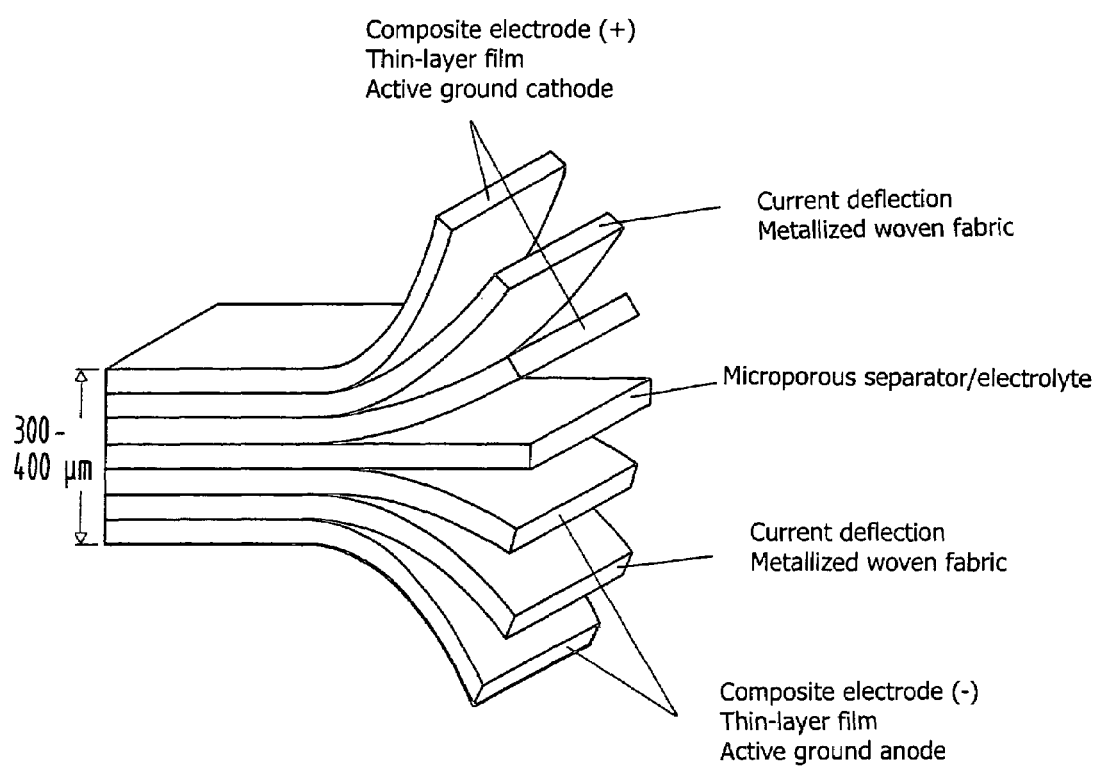

Thin-layer electrode stack for lithium ion batteries

METHOD FOR PRODUCING CATHODES AND ANODES FOR ELECTROCHEMICAL SYSTEMS, METALLISED MATERIAL USED THEREIN, METHOD AND DEVICE FOR PRODUCTION OF SAID METALLISED MATERIAL

The invention relates to a method for depositing a coating onto a substrate, a substrate thereby produced, as well as the use of the substrate as a cathode in a lithium ion battery, a method for production of an active cathode or anode mass, a method for production of a cathode and an anode with said mass, the cathode and/or anode thereby produced, a metallized material, a method for its production, as well as a method for execution of the last-mentioned method.

As the metallized material and its production plays a role in all aspects of the invention, it will be explained first.

In the present invention, the term galvanizing is understood to mean a current-supported electrolytic depositing of a metal or a non-metal, which is present as an ion in an aqueous solution, possibly in combination with a dispersion of a material that is not soluble but is dispersible in the aqueous solution, onto a conductive substrate. The term electroless depositing refers to the depositing of a metal or an alloy or a dispersed material onto a substrate, which is not supported by external current, but is instead brought about by a reduction agent.

Here, the term "material" refers, for example, to a knitted fabric, a fleece, a woven fabric or similar material, while "fiber" refers, for example, to a filament or a combination of filaments. The invention preferably relates to a woven textile comprised of individual synthetic filaments.

The attribute of a material is that it is essentially flat and has relatively little depth. A material is by definition not rigid, but instead more or less soft.

Materials that have been made electrically conductive are used in technology in many different ways, such as in filter technology, in which a defined mesh width is a critical attribute. The use of such a material is especially important in the production of batteries, where it is used in place of sheet metal or lattice electrodes, because its surface is much larger and, moreover, its weight is lower.

For example, a mass carrier for electrodes of galvanic primary or secondary elements from an open-mesh, three-dimensional network structure of synthetic threads coated with more or less conductive, thin metal coatings, as well as electrodes made therefrom are known from DE 195 03 447 A1. However, nothing is stated about the points of intersection of the threads, especially not the fact that during galvanization they are moved relative to one another, so that it can be assumed that the points of intersection in the network structure are baked.

Another material forming an electrode lattice, in the form of needled felt, is known from DE 40 04 106, and is needled twice to improve its strength. However, this also makes the felt stiffer and more dense. During the initially chemical and subsequently galvanic metallization, connecting metal nodal points which bake the fibers are produced at intersecting fibers. Although these nodal points additionally increase the stiffness of the felt in a manner, which is, in itself, desirable, they reduce the overall surface area.

Although such nodal points reduce the available surface of the fibers, they reliably establish a contact. Consequently, no efforts have thus far been undertaken to avoid their development.

In contrast, DE 27 43 768 describes a woven textile which is metallized in an electroless immersion bath and with which the thickness of the metal layer may not exceed 0.3 µm. Thus, the coated woven textile acts as a resistor to the flow of electric current, so that the known, coated woven textile is designed for electrically heatable clothing. Whether or not intersecting fibers are baked together during metallization is unforeseeable. However, baked areas would probably break during movement of the material, due to extremely thin layer thickness, so that the metallization would be incomplete in such areas. This does not impair the effect of the material acting as an electric resistor.

The invention is intended to improve the material of the type initially mentioned in one respect. In particular, its usability in batteries is to be improved by enlarging the metallized surface.

According to the invention, this object is solved in that the entire surface of all fibers, including nodal points, is metal- or alloy-plated and the fibers are moveable relative to one another.

As a result of the fibers being coated on all sides, a maximum metallized surface is guaranteed, while the mobility of the fibers ensures that this metal surface can also be utilized and is not reduced by, for example, fibers that are pressed tightly together, such as those which inevitably occur in the needled felt disclosed by DE 40 06 106. The material of the invention can exhibit a geometry corresponding to the respective purpose of use, wherein the mobility of the fibers does not mean that the material changes or impairs this geometry during use, but rather that the fibers are not pressed onto one another at the points of intersection to such an extent as to become immobile. The range of mobility, in this case, can be extremely small.

The metallized fibers rest on top of one another at the points of intersection and thus provide a sufficient electrical contact so that, contrary to expectations, no nodal points are necessary at which the metal coatings of the individual fibers are baked together.

Thus, in a preferred embodiment of this aspect of the invention, the entire surface of all fibers bears a galvanically or electrolessly applied metal or alloy coating. The points of intersection of the fibers are not baked together, but instead interlock while fully preserving the geometry, wherein the electroless or galvanic coating of the fibers that have previously been made conductive permits uniform application of the metal up to a preferred thickness of between more than 0.5 µm and approximately 15 µm. A galvanic application is, in this case, preferably a crystalline metal coating, or so-called microstructure, while an X-ray-amorphous, glass-like structure always develops with an electroless immersion bath. It has become apparent that thick, glass-like structures at intersections tend to bake and/or are so closely adjacent to one another that the space between them is too small to allow an electrolyte to penetrate into it, thus reducing the metallic surface. How this problem can be corrected is demonstrated further below.

An especially preferred embodiment is one in which the interaction between the mobility of the fibers and their crystalline coating guarantees the full accessibility of the entire metal surface, while mobility can, if necessary, be restricted to a minimum level, so that a woven textile according to the invention can also be used as a precision filter, for example. During the preferred use of the material of the invention as a battery electrode, the fibers can, however, exhibit a higher degree of freedom of motion. In this case, a glass-like coating could also be used which, however, can also be produced by galvanic means, such as in cases where special corrosion resistance is necessary.

The thickness of the metal coating is preferably greater than 0.5 µm and can range up to 15 µm.

All non-metallic fibers can be used as fiber material, although mineral fibers, ceramic fibers, glass fibers and synthetic fibers are preferred. Of these [fibers], in turn, fibers of polyester, polytetrafluorethylene, polyamide, polycarbonate, polyethylenimine, polyethylene, polypropylene, polyvinylidene fluoride, aramide fibers, and/or perfluoralkoxy fibers are preferred.

Any metal can be used as the metal coating. Preferred are base metals, especially Ni, Al, Co and Cu, alloys, especially NiPCo, NiPMn, NiP, FeNiCr, NiWo, NiPWo, NiSn, CoSn, NiMg and NiMo, and precious metals, especially silver, gold, platinum, palladium, ruthenium, and rhodium.

The preferred use of the materials of the invention, especially woven textiles, is their use as a functional material for microporous electrodes in electrochemical systems, e.g., as a current deflector and/or electrode material in Ni/MH batteries in battery production, as well as an electrode in fuel cells, so that, as a result of the large surface areas of the three-dimensional structures obtained and the targeted control of the topography of the deposited metal coatings (targeted production of metallic coatings with very large surface areas), the efficiency and performance density of the systems listed above can be substantially increased.

The active masses of the batteries (cathode and anode material) can be very effectively introduced into these microporous electrodes. As a result, outstanding adhesiveness of the active materials can be achieved in lithium ion polymer systems.

Other preferred areas of application lie in filter technology, gas cleaning ($O_2$), alkalic water electrolysis (as positive and negative electrode), in weapons technology, security technology, and protective work clothing, as well as in use as catalysts and resistance material for generation of heat and for ionizing air processing in air cleaning devices.

Preferred battery types in which the metallized material of the invention can be used are lithium ion, lithium ion polymer and NiMH batteries, wherein the material serves as a current deflector and electrode. The active masses are introduced into the materials.

The preferred fuel cell type is the low temperature PEM fuel cell.

In each case, the material structure is optimized in such a way that the highest possible conductivity and largest possible catalytically active surface (for use as fuel cells and catalysts), as well as largest possible active surface are achieved.

As indicated initially, a material of the invention cannot be produced by means of known methods in which the entire material has been coated electrolessly or, after it has been made electrically conductive, has been coated galvanically, since there will always be non-coated zones at the points of intersection of the fibers.

A possible option would be to manufacture a metallized filament and then to produce a material with this metallized filament. However, extreme care would be necessary during weaving of the material to avoid damaging the metal coating which, after all, can be as thin as 0.5 µm.

According to the invention, therefore, the already finished textile material made of the materials described above is subsequently treated by initially etching and cleaning its surface and is then, possibly following activation with palladium, galvanically, electrolessly or, if applicable, mechanically (dusting of metal powder), or by means of sputtering, vaporizing or chemical vapor depositing (CVD), provided with an electrically conductive film until, finally, the actual metal coating is applied by electroless depositing or galvanization. During this electroless depositing or galvanization, a relative motion of the fibers in the material is established, so that they are not at rest on top of one another, but instead are moved relative to one another, so that no permanent points of intersection can develop at which two fibers could become baked together and thereby form a metallic nodal point. The actual electroless application or galvanization for production of the metallized materials of the invention takes place in a manner known in the art.

It was proposed some time ago (DB 22 39 547) to run a stranded conductor consisting of individual copper or other metal wires during galvanic tin-plating partially voltage-free, with alternating tension and with alternating curvature, so that the individual wires are subjected to a constant motion relative to one another while passing through the bath, as a result of which they can be galvanically coated on all sides. However, the method of this publication is conditioned on the metal wires being rigid, thus enabling the stranded conductors to be run voltage-free, which is not possible with a textile material.

The invention, however, has recognized that the fibers of a material, in spite of the requirement of said fibers being constantly under tension while being passed through a bath, can be subjected to a reciprocal relative motion which is sufficiently large to ensure that, during electroless depositing or galvanizing, baking of the points of intersection is avoided and error-free coating of all fibers on all sides is achieved. The production of the metallized material of the invention was made possible in this manner. The production process is discussed in detail below.

Before a galvanic coating can be applied to a non-conductor, said non-conductor must first be provided with an electrically conductive film.

Electroless application of an electrically conductive film can consist, for example, in the application of sulfides and polysulfides. In this process, cobalt, manganese, or stannous sulfides and polysulfides are preferably applied to the surface of the material, followed by an intermediate rinsing process and subsequent immersion into a sulfide-containing cross-linking solution, thereby generating a firmly adhering metal sulfide/polysulfide coating.

The conductive film can also be produced by vaporization or sputtering with a metal or by means of CVD.

However, it is also possible to divide this step into three sub-steps: conditioning, activation and electroless or galvanic metallization of the surface. This will be discussed in greater detail below.

Prior to the electroless application of a sulfide/polysulfide film, and to sputtering, vaporization, CVD or conditioning, the surface is generally cleaned and etched, which prepares it for the subsequent steps. This preparation is preferably accomplished by exposed the material to an atmospheric plasma.

This plasma is a non-thermal plasma. Due to a very high excitation frequency ranging from several kilohertz to approximately 3 gigahertz, and due to the resulting high field densities, a non-equilibrium plasma is achieved in which the electron energy in the plasma is greater than the energy of the ions and the excited particles.

The plasma consists of innocuous gases such as oxygen or air, whose physical and chemical action is based on the high particle energy.

The plasma gas, such as oxygen, nitrogen, argon, ammonia, $CF_4$ or a similar gas, is selected on the basis of the textile material. During activation in microwave plasma, polar groups are incorporated on the material and/or fiber surface, generally the surface of a polymer. UV radiation forms polymer radicals in the plasma at room temperature, which react with the free radicals in the corresponding plasma gas. This results in polar groups, such as hydroxyl, carboxyl or carbonyl groups, as well as amine groups, which are incorporated into the polymer surfaces. These effects are limited to the immediate surface zone (1 μm to 10 μm), so that the polymer body remains untouched.

Preferably, a plasma chamber is used which is accessible from two sides so that the material to be activated is continuously passed through the chamber and plasma. The height of the chamber is sufficient to allow for passage of any type of textile or fleece material. However, the chamber, which is open at both ends, has no seal, nor is it evacuated. However, the chamber walls are cooled so that a plasma with long-term stability can be produced. The cooling system is preferably an air-cooling system.

The activation is preferably accomplished by means of a colloidal palladium compound, such as that which is already fundamentally known from DE 37 43 743. This method has proved to be advantageous over many other known methods.

During electroless metallization, a metal ion derived, for example, from a metal salt, is deposited electrolessly as a metal onto the activated material by means of a reduction agent in a manner known in the art. In one embodiment, the metal is identical to that which is applied during an optional, subsequent galvanization. In this process, all chemically reducible metal ions can be used, i.e., including ions of base metals such as nickel and aluminum.

The metallization coating can be applied following activation or it can also be applied galvanically.

As already mentioned, the electrochemical aspect of the electroless or galvanic application of the metal or alloy coating onto the material substrate which has been made electrically conductive is known in the art and widely described in the literature. In this process, all metals and alloys mentioned above during the discussion of the material of the invention can be applied. Two exemplary electroless applications and two galvanic applications are described in the following example.

As far as the simultaneous motion of the material during electroless or galvanic application is concerned, it is conceivable that the bath for the electroless or galvanic application (referred to in the following as "electrolyte bath") be used for motion, and that the material be placed in batches into a sort of galvanic "whirlpool." This, however, would be a relatively non-productive process.

Accordingly, in the invention a more productive, continuous process is preferred in which a defined relative motion of all fibers is achieved by mechanically stressing the material as it is being conveyed through the electrolyte bath.

For this purpose, an apparatus is preferred in which the material is conveyed over at least two rollers, at least one of which is elliptical. If two elliptical rollers are used consecutively, they must preferably possess the same rotation speed but, given their large cross-sectional axes, they may not be arranged in parallel.

During conveyance, the elliptical roller ensures that the segment between two rollers covered by material constantly changes in rhythmical fashion, so that the material is constantly expanded and then released consecutively in the direction of conveyance. In the case of a woven textile, the warp threads are stretched and shift accordingly relative to the woof threads.

It is also preferred to provide at least one additional roller which features circumferential profiling progressing at a diagonal to the circumference, such as diagonally progressing, elliptical grooves in the cylindrical exterior surface of the additional roller. In the case of a material in the form a woven textile, this roller grips the warp threads and moves them in their longitudinal direction relative to the woof threads.

As explained above, the motion of the warp threads relative to the woof threads takes place in a defined manner. In the case of a fleece, the threads are also moved relative to one another in the device of the invention, but in random fashion.

A preferred electrolyte bath according to the invention features a series of elliptical rollers arranged above the fluid level and, between each two elliptical rollers, an additional roller that is positioned below the fluid level. Thus, the material runs in a zigzag pattern from one elliptical roller into the bath, onto an additional roller, and from this roller out of the bath again, wherein the angle of contact of approx. 270° at each of the rollers permits the rollers to become fully effective. Following several immersion procedures, such as five, the material runs out of the electrolyte bath, wherein each of the fibers is fully metallized and none of the fibers is baked to the remaining fibers.

Another aspect of the present invention relates to the production of active masses in the form of a foil and the production of composite electrodes using these foils, wherein the composite cathode is a lithium ion cathode. A material provided with a metal or alloy coating by means of electroless application or galvanization, which is structured and produced as described above, except that the mobility of the fibers and/or the relative motion of the fibers during electroless or galvanic application is only an optional feature, is used as the substrate or mass carrier.

For the production of an active lithium ion cathode mass, at least one lithium-containing spinel, which is preferably selected from among $LiMn_2O_4$, $LiCoO_2$, $LiNiO_2$, $LiTiS_2$ and $LiVSe_2$, is combined with high conductivity soot (which was obtained from Degussa AG, Germany) and an organic binder such as polytetrafluorethylene or preferably polyvinylidene fluoride (PVDF, obtained from Aldrich, Germany), which is inert under the operating conditions of an electrode. Subsequently, the mixture is worked into a sufficient amount of high-boiling aprotic polar solvent, such as N-methyl-2-pyrrolidinone (NMP, obtained from Aldrich, Germany), to achieve a homogeneous paste with a dough-like consistency.

Preferred amounts of the above components of the active lithium ion cathode mass are as follows:

Dry mixture:

Lithium spinel, preferably $LiCoO_2$, 55 to 75 wt. %, more preferably 60 to 65 wt. %;

High conductivity soot: 25 to 35 wt. %, preferably 30 wt. %;

Inert binder, preferably polyvinylidene fluoride, 5 to 10 wt. %

(All percentages refer to the total weight of the dry mixture.)

High-boiling aprotic polar solvent, preferably N-methyl-2-pyrrolidinone: 1-2 ml per 10 g of dry mixture Using rollers, the above paste is rolled into a thin film with a thickness of 300 to 500 μm, preferably 400 μm, and dried 16 to 30 hours at 50 to 70° C., preferably approximately 20 to 24 hours at approximately 60° C., whereby an active cathode mass in the form of a thin film is obtained.

To produce the cathode, the active cathode mass in the form of a thin film is worked, by means of calendaring, into a material coated with a metal or alloy coating suitable for a cathode.

This material can be produced in the manner described above under the first aspect of the invention, wherein, however, the feature of mobility of the fibers, i.e., the passing through of the electroless coating or galvanization during constant relative motion of the fibers, is optional.

Ni, aluminum and silver are preferred as metallic coatings for the cathode. If nickel is used, it is preferable to protect the cathode with a so-called primer to provide protection against corrosion by electrolyte and conductive salts. The primer can, for example, be a carbon, which is precipitated, together with the metal, from a carbon dispersion in a manner known in the art. However, a carbon layer consisting of very fine carbon a few hundred nanometers in thickness (particle size ranging from 6-100 nm) can also be precipitated, also from a dispersion, following completion of the nickel precipitation, or the nickel coating can be additionally coated with a passivating coating of aluminum, silver, an alloy or titanium with a thickness of 10 to 100 nm to protect against corrosion.

The introduction of the active cathode mass into the cathode mass carrier (material coated with metal or an alloy) in the form of a thin film and by means of calendaring is performed at a temperature of 120-150° C., preferably 130-140° C. Depending on the purpose of application, a thin film cathode mass is applied to both sides of the material during this process. As a result of calendaring, the thin film penetrates through the openings in the material and surrounds it on all sides, especially when two thin films are used, resulting in a mechanically highly stable composite cathode in which the active mass is optimally distributed and no empty spaces exist between the deflecting material (coated material) and the active mass. Accordingly, the internal resistance of the composite cathode assumes very small values, which is extremely important in terms of the operating efficiency of a rechargeable lithium ion battery.

To produce an anode mass in the form of a thin film, the following components are initially mixed together:

90-95 wt. % of graphite;

5-10 wt. % of a binder, which is inert under the operating conditions of an anode, such as polytetrafluorethylene or, preferably, polyvinylidene fluoride;

wherein the percentages refer to the total weight of this dry mixture.

Subsequently, the dry mixture is worked into a sufficient amount of high-boiling aprotic polar solvent, preferably 1-methyl-2-pyrrolidinone to achieve a homogeneous paste with a dough-like consistency (generally 1-2 ml of solvent per 10 g of dry mixture).

Using rollers, the above paste is rolled into a thin film with a thickness of 300 to 500 µm, preferably 400 µm, and dried 16 to 30 hours at 50 to 70° C., preferably approximately 20 to 24 hours at approximately 60° C., whereby an active anode mass in the form of a thin film is obtained.

To produce the anode, the active anode mass in the form of a thin film is worked, by means of calendaring, into a material coated with a metal or alloy coating suitable for an anode.

This material can be produced in the manner described above under the first aspect of the invention, wherein, however, the feature of mobility of the fibers, i.e., the passing through of the electroless coating or galvanization during constant relative motion of the fibers, is optional.

Copper is generally used as a metal coating for the anode.

The introduction of the active anode mass into the anode mass carrier (e.g., material coated with copper) in the form of a thin film is performed as with the introduction of the cathode mass into the cathode mass carrier described above.

This results in anodes, which exhibit outstanding properties similar to those of the cathodes produced in the manner described above.

In a complete rechargeable lithium ion battery system, the anodes and cathodes are separated by a separator made of microporous polymer foil (e.g., Celgard® by Hoechst Celanese). To improve conductivity, minimum amounts of electrolyte, such as LP30 Selectipur® (Merck Battery Materials, Germany), are used. The separator foil is briefly soaked with electrolyte and subsequently combined with the anode and cathode to construct a thin layer electrode stack for lithium ion batteries, as depicted schematically in FIGS. 4 and 5.

A lithium ion battery produced with the thin layer composite electrode of the invention described above features significantly higher current densities and a relatively low weight when compared with conventional lithium ion batteries.

In a further aspect, the present invention relates to a method for producing a coating on a substrate, which comprises at least one lithium-containing spinel, wherein the lithium-containing spinel is applied onto the substrate together with a metal or an alloy. The substrate coating is applied electrolessly or galvanically from an aqueous solution of one or more ionic compounds of the metal or the alloy and a dispersion of the lithium-containing spinel(s), obtained with the aid of a tenside, in the solution, which thus becomes a dispersion mixture.

The soluble ionic compounds of the metals and metal components of the alloys are commonly simple water-soluble mineral salts. The ionic compound of the possible alloy component phosphorus is commonly a hypophosphite.

The substrate can, for example, be a material, which has been made conductive, of fibers that are inherently non-conductive, a metal foil, or an expanded metal.

The material comprised of inherently non-conductive fibers or the synthetic foil can, for example, be made conductive by means of electroless application or galvanic application of a conductive coating, which is selected from among metal, metal sulfide and/or polysulfide or a conductive polymer applied galvanically, electrolessly, or by means of vaporization, sputtering, or CVD.

The material of the synthetic foil can comprise a material, which is selected from among polyester, polytetrafluorethylene, polyamide, polycarbonate, polyethylenimine, polyethylene, polypropylene, polyvinylidene fluoride, aramide fibers, and perfluoralkoxy fibers.

The substrate is preferably a material comprised of inherently non-conductive fibers, which includes, in addition to fibers of the synthetic materials mentioned above, glass fibers, mineral fibers and ceramic fibers, which material is treated, prior to the electroless or galvanic application of the coating of metal or alloy and lithium-containing spinel, in the manner described above in connection with the production of the inventive material.

The finely distributed spinel is kept in dispersion by a dispergent, which is preferably an anionic tenside, such as a commercially available tenside in the Aerosol OT series (Cyanamid, Germany). During electroless precipitation or galvanization, it is then incorporated, in finely distributed, dispersed form, into the metal or the alloy, which forms a matrix with the spinel (precipitated from the water-soluble ionic compounds). Up to 8% or more of spinel (relative to total coating weight) can be incorporated into the matrix. The exact rate of incorporation can be controlled by parameters such as special tenside additives, special precipitation temperatures, and special concentrations of the spinel dispersed in the solution.

The lithium-containing spinel(s) is(are) preferably selected from among $LiMn_2O_4$, $LiCoO_2$, $LiNiO_2$, $LiTiS_2$ and $LiVSe_2$.

In addition to the dispersed spinel, carbon dispersions and/or dispersions of an inert synthetic resin binder can also be present in the dispersion mixture, and can be incorporated into the matrix metal or the matrix alloy together with the spinel. The carbon protects against corrosion, and the inert synthetic resin binder serves, among other things, as a sort of "buffer" for the carbon, since, during use of the inventively coated substrates as lithium ion cathodes in a rechargeable battery (secondary cell), the lithium ions intercalate in the carbon during discharging of the battery and then diffuse out of the battery when it is charged, thereby changing the size of the carbon particles. This creates the risk of the carbon crumbling, which is eliminated by the use of the binder.

Polytetrafluorethylene and, especially preferably, polyvinylidene fluoride can, for example, be used as the inert synthetic resin binder.

A carbon with a size in the nanometer range is preferably used as the carbon.

In addition, the dispersion mixture also generally contains an acid, preferably boric acid. A hypochlorite can also be present in the mixture as a reduction agent.

The electrolessly or galvanically applied matrix metals or matrix alloys are preferably selected from among Ni, Cu, Al, Co, Ag, Au, Pt, Pd, Ru, Rh, NiPCo, NiPMn, NiP, FeNiCr, NiWo, NiPWo, NiSn, CoSn, NiMg, and NiMo.

In light of the use of the coated substrate as a lithium ion cathode, the coating especially preferably comprises a metal selected from among Ni, Al, and Ag.

For purposes of passivation, the coating can also be provided with an additional coating of aluminum, silver, an alloy, or titanium with a thickness of 10 to 100 nm, or with carbon, as has already been described above in connection with the thin layer composite cathodes. This is especially advantageous with a coating that contains nickel.

The volumes of reagents in the dispersion mixture used during galvanization generally fall within the following ranges:

soluble ionic compound(s) in a total volume of 240 to 380 g/l of dispersion mixture;

the lithium spinel(s) in a volume of 100 to 300 g/l of dispersion mixture;

the tenside in a volume of 1 to 2 ml/l of solution;

carbon, if used, in a volume of 1 to 5 g/l of dispersion mixture;

inert synthetic resin binder, if used, in a volume of 5 to 10 g/l of dispersion mixture;

boric acid in a volume of 10-60 g/l of dispersion mixture hypophospite, if used, in a volume of 10 to 60 g/l of dispersion mixture.

In addition, the pH of the dispersion mixture during galvanization is preferably 3-4, and the temperature at which the precipitation is performed is, for example, 40-55° C. The current densities used fall within a range of 1 to 10, preferably 2 to 5 $A/dm^2$.

The thickness of the precipitated coating preferably ranges from 0.5 μm to 15 μm.

Several of such coating layers can also be applied to a substrate.

The invention also relates to a substrate comprised of a material of non-conductive fibers which has been made conductive, a synthetic foil which has been made conductive, a metal foil or an expanded metal which features a coating comprising a metal or an alloy and one or more lithium-containing spinels embedded into the metal or the alloy. The metal of the alloy used in this process is preferably selected from among Ni, Cu, Al Co, Ag, Au, Pt, Pd, Ru, Rh, NiPCo, NiPMn, NiP, FeNiCr, NiWo, NiPWo, NiSn, CoSn, NiMg and NiMo, and the spinel(s) is(are) preferably selected from among $LiMn_2O_4$, $LiCoO_2$, $LiNiO_2$, $LiTiS_2$ and $LiVSe_2$.

The non-conductive fibers of the material preferably comprise glass fibers, mineral fibers, ceramic fibers, or synthetic fibers. The synthetic fibers preferably comprise a material selected from among polyester, polytetrafluorethylene, polyamide, polycarbonate, polyethylenimine, polyethylene, polypropylene, polyvinylidene fluoride, aramide fibers, and perfluoralkoxy fibers.

The coating can further contain carbon, an inert synthetic resin binder, which is preferably polyvinylidene fluoride.

The coated substrates obtainable by means of the method described immediately above are preferably used as cathodes in lithium ion batteries. The advantages of these cathodes consist in the fact that the active mass can be applied, together with the material which is essential for deflection, in a desired layer thickness, which results in a highly compact composite material with a practically pore-free coating.

Anodes that can be used in a lithium ion battery can also be produced by means of dispersion precipitation onto one of the substrates specified above. A typical example of this is an anode coated with copper/graphite.

In this process, the composition of the dispersion mixture for galvanic precipitation is, for example, as follows:

160 to 240 g/l of a soluble copper salt, such as copper sulfate 40 to 100 g/l of sulfuric acid 30 to 150 mg/l of a chloride (e.g., sodium chloride)

100 to 150 g/l of graphite, and 1-2 ml/l of tenside.

In this case, the galvanization process is preferably performed at a temperature of 20 to 40° C. and a current strength in the range of 1 to 10, preferably 2 to 5 $A/dm^2$. At the graphite quantities indicated above, incorporation rates (of graphite into copper) of 1.5 to 3 wt. % relative to the total weight of the coating can be achieved.

Using these cathodes and anodes, which generally contain, in a single layer, the conductive material needed for deflection and the active cathode and/or anode mass, a complete lithium ion battery can be produced, in a manner similar to that discussed above in connection with thin layer composite foil lithium ion batteries. In this process, the anodes and cathodes feature maximum compactness and a practically pore-free coating.

EXAMPLE

1. Etching and Cleaning

The material comprised of electrically non-conductive fibers is exposed to an atmospheric plasma in the manner described above. This cleans and etches the surface, making it receptive to additional treatments.

2. Conditioning of the Surface

In an activator with the following composition:

0-5% 2-propanol, 10-25% 2-amino-ethanol, at a temperature of 50-80° C. and for a period of 5-10 min., uniform coverage of the fiber surface is achieved, and absorption of the palladium cores in the following step is supported.

3. Activation on the Basis of Colloidal Palladium Compound

During activation of the fiber surface, colloidal palladium compounds are absorbed at the surface. The following compounds are used:
6 g/l of stannous chloride
20-400 ppm of palladium The temperature ranges from room temperature to 50° C. The treatment lasts 3-10 min.

4. Electroless (Chemical) Metallization

Copper electrolyte example:
10-50 g/l of copper sulfate
10-50 g/l of Rochelle salt
5-20 g/l of sodium hydroxide solution
10-100 g/l of formaldehyde
pH value: 10.5-12.5
Temperature: 20-50° C.
Duration: 1-10 min.

Nickel electrolyte example:
10-30 g/l of nickel sulfate
10-50 g/l of sodium hypophosphite
50-100 g/l of ammonia (25%)
pH value: 8-10
Temperature: 30-50° C.
Duration: 3-10 min.

Galvanic metal application

Figure 5:
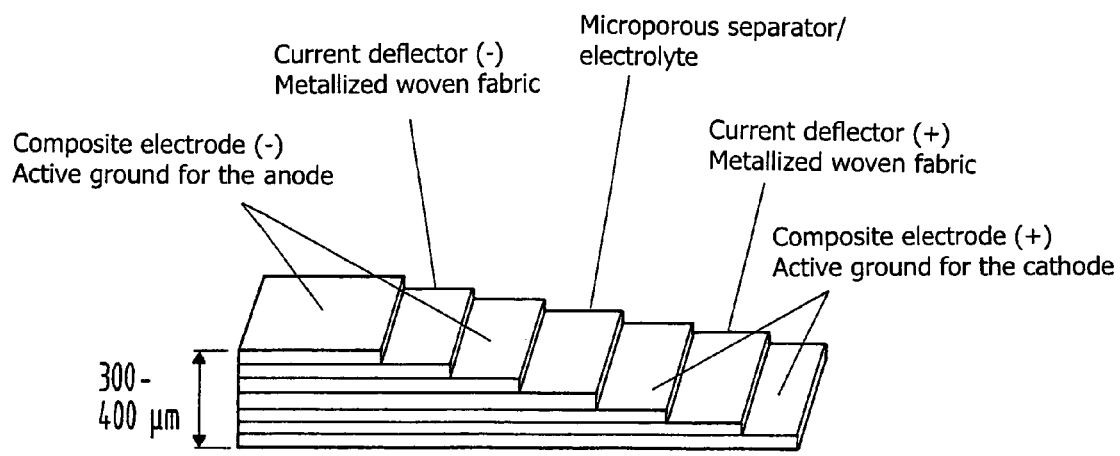

Copper electrolyte example:
60-249 g/l of copper-(II)-sulfate-5-hydrate (corresponds to 20-60 g/l of Cu)
40-200 g/l of sulfuric acid
30-150 g/l of chloride
Wetting agent
Temperature: 20-35° C.
Current density: 1-8 A/dm$^2$ Nickel electrolyte example:
240-310 g/l of nickel sulfate
45-50 g/l of nickel chloride
30-40 g/l of boric acid
Wetting agent
pH value: 3-5
Temperature: 40-70° C.
Current density: 3-10 A/dm$^2$ A schematic exemplary embodiment of a device for metallizing material according to the invention as well as a schematic depiction of lithium ion batteries are shown in the enclosed drawing, in which FIG. 1 shows a sectional general depiction of the device, FIG. 2 shows an enlarged, sectional depiction of the roller sequence in the galvanic bath, FIG. 3 shows an aerial view of the lower roller of the roller series depicted in FIG. 2, FIG. 4 shows a schematic, exploded view of a lithium ion battery with think layer composite electrodes, and FIG. 5 shows a schematic, sectional view of a lithium ion battery with thin layer composite electrodes.

FIG. 1 shows a device for producing a metallized material. A woven track of synthetic material 10 is disposed on an unrolling supply roll 11 and moves continuously in the direction of the arrow and, consecutively, through a plasma chamber 1, in which atmospheric plasma acts on the material 10, and cleans and activates it, through a conditioning bath 2, which opens the fiber surface and prepares it for the subsequent activation, through a rinsing bath 3, through an activation bath, in which colloidal palladium compounds are absorbed at the surface, through an electroless (chemical) metallizing bath, in which the surface of the fibers is made conductive, through an additional rinsing bath 6, through a galvanic or electroless electrolyte bath 7, in which metal application to the fibers take place, yet another rinsing bath 8, and a horizontal drying shaft 9 onto the take-up roll 12.

The conveyance paths in the atmospheric plasma chamber 1 and the drying shaft 9 are positioned at the same level. Also at this level, diversion rollers 13 are arranged which divert the horizontally arriving material 10 into the underlying bath 2-8 or steer the material 10 emerging from this bath 2-8 into the horizontal [plane] and to the next diversion roller 13.

At least one immersion roller 14, whose axis runs in parallel to that of the diversion rollers 13 and take-up rolls 11, 12, is disposed in each bath 2-8 in proximity to the floor of said bath. In each of the baths 2-6 and 8, an immersion roller 14 is disposed to which two diversion rollers 13 are assigned; five immersion rollers 14, to which six diversion rollers 13 are assigned, are disposed in the electrolyte bath 7.

The material 10 rolls off the roll 11, passes through all baths in a zigzag pattern, passes through the plasma chamber 1 and the drying shaft 9 horizontally, and is taken up onto the roll 12.

At least the diversion rollers 13, which are assigned to the electrolyte bath 7, feature an elliptical profile. The two diversion rollers 13, each of which is assigned to an immersion roller 14, are arranged in profile in such a way that the large axes of the elliptical profile are positioned vertical to one another (FIG. 2).

The immersion roller 14 can be spring-loaded in a downward direction, so as to keep the track of material 10 tightly spanned at all times.

The immersion roller 14 features circumferential profiling in the form of elliptical, i.e., diagonally arranged grooves 15 (FIG. 3).

When the track of material 10 runs across the rollers 13 and 14, which are shaped as depicted in FIG. 2 and 3, the track 10 is rhythmically stretched between adjacent elliptical rollers 13 and, at the same time, moved in a lateral direction by the profile 15 of the immersion roller 14. The material "breathes," in a manner of speaking, as it moves across the rollers 13, 14.

These specially shaped rollers 13 and 14 are primarily assigned to the electrolyte bath 7, where they must ensure that fibers are not baked together at points of intersection. However, they are also useful in the other baths 2-6 and 8, as the motion of the fibers promotes rapid coating of the material 10 in each respective bath, thereby permitting more uniform and expeditious processing of the material 10.

Individual rollers or all rollers 13, 14 can be [mechanically] driven, as can the take-up roll 12. The feed roll 11 can be provided with a brake. The height of the rollers 14 can be adjusted individually, so as to adjust the dwell time of the material 10 in the applicable bath.

The invention claimed is:

1. A metallized, electrically conducting textile material, comprising:
   a plurality of overlapping electrically non-conducting fibers, each fiber having a surface;
   a first metallic coating that substantially covers the surface of each of the fibers, including at points of intersection between the fibers, and has a thickness of between 0.5 µm and 15 µm; and
   a second coating disposed on the first metallic coating, the second coating comprising one or more metals and one or more lithium-containing spinel materials, wherein the second coating covers the first metallic coating on the surface of each of the fibers, including at points of intersection of the fibers.

2. The material of claim 1, wherein the first metallic coating comprises a single metal.

3. The material of claim 2, wherein the single metal is selected from the group consisting of Ni, Cu, Al, Co, Ag, Au, Pt, Pd, Ru, and Rh.

4. The material of claim 1, wherein the first metallic coating comprises an alloy comprising two or more metals.

5. The material of claim 4, wherein the alloy is selected from the group consisting of NiPCo, NiPMn, NiP, FeNiCr, NiWo, NiPWo, NiSn, CoSn, NiMg, and NiMo.

6. The material of claim 1, wherein the fibers comprise glass fibers, mineral fibers, ceramic fibers, or synthetic fibers.

7. The material of claim 1, wherein the fibers comprise one or more of a polyester, polytetrafluoroethylene, polyamide, polycarbonate, polyethylenimine, polyethylene, polypropylene, polyvinylidenefluoride, aramide, and a perfluoroalkoxy.

8. The material of claim 1, wherein the second coating comprises a metal selected from the group consisting of Ni, Cu, Al, Co, Ag, Au, Pt, Pd, Ru, and Rh.

9. The material of claim 1, wherein the second coating comprises an alloy selected from the group consisting of NiPCo, NiPMn, NiP, FeNiCr, NiWo, NiPWo, NiSn, CoSn, NiMg, and NiMo.

10. The material of claim 1, wherein the one or more lithium-containing spinel materials comprises one or more members selected from the group consisting of $LiMn_2O_4$, $LiCoO_2$, $LiNiO_2$, $LiTiS_2$, and $LiVSe_2$.

11. The material of claim 1, wherein the second coating further comprises carbon.

12. The material of claim 1, wherein the second coating further comprises resin binder.

13. The material of claim 12, wherein the resin binder comprises polyvinylidenefluoride.

14. A fuel cell comprising an electrode comprising the material of claim 1.

15. The fuel cell of claim 14, wherein the fuel cell is a low temperature proton exchange membrane (PEM) fuel cell.

16. A battery comprising an electrode comprising the material of claim 1.

17. The battery of claim 16, wherein the battery is a lithium ion battery, a lithium ion polymer battery, or a NiMH battery.

* * * * *

UNITED STATES PATENT AND TRADEMARK OFFICE
CERTIFICATE OF CORRECTION

| | |
|---|---|
| PATENT NO. | : 7,344,776 B2 |
| APPLICATION NO. | : 10/312618 |
| DATED | : March 18, 2008 |
| INVENTOR(S) | : Wolfgang Kollmann and Helga Kollmann |

It is certified that error appears in the above-identified patent and that said Letters Patent is hereby corrected as shown below:

In the drawings, Sheet 3, Fig. 4, replace "Current deflection" with --Current collection-- in two places; Sheet 4, Fig. 5, replace "deflector (-)" with --collector (-)-- and replace "deflector (+)" with --collector (+)--.

Column 3, line 5, replace "[fibers]" with --fibers--; at line 18, replace "deflector" with --collector--; at line 19, replace "Ni/MH" with --NiMH--; and at line 40, replace "deflector" with --collector--.

Column 4, line 53, replace "exposed" with --exposing--.

Column 6, line 2, replace "form a" with --form of a--.

Column 10, line 6, replace "Al Co" with --Al, Co--.

Column 11, line 58, replace "think" with --thick--.

Column 12, line 11, replace "take" with --takes--; at line 21, replace "[plane]" with --plane--; at lines 62-63, replace "[mechanically]" with --mechanically--.

Signed and Sealed this

Nineteenth Day of August, 2008

JON W. DUDAS
*Director of the United States Patent and Trademark Office*